June 6, 1961
F. W. STEIN
2,987,227
TEST CELL RELEASE LOADING DEVICE
Filed Sept. 3, 1957
2 Sheets-Sheet 1
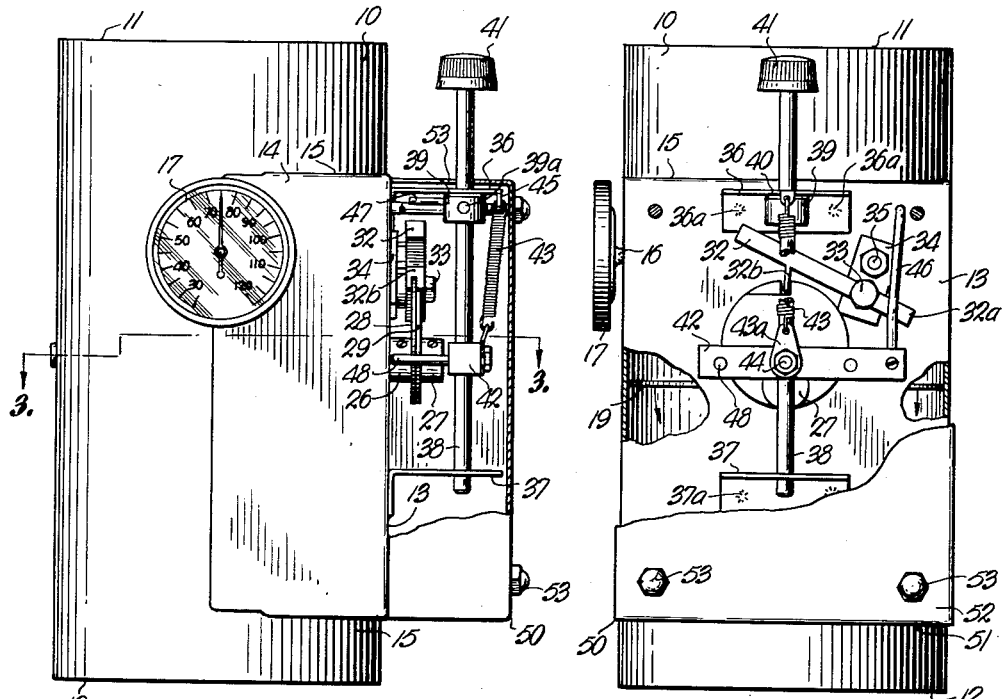
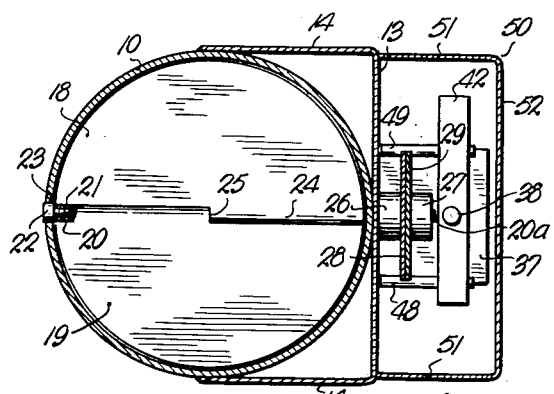
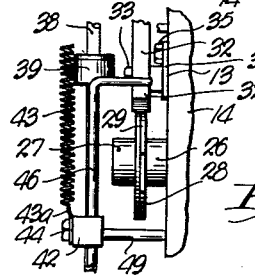
INVENTOR.
Frederick W. Stein
BY
Thos. E. Scofield
ATTORNEY.

June 6, 1961  F. W. STEIN  2,987,227
TEST CELL RELEASE LOADING DEVICE
Filed Sept. 3, 1957  2 Sheets-Sheet 2

INVENTOR.
Frederick W. Stein
BY
ATTORNEY.

United States Patent Office 2,987,227
Patented June 6, 1961

2,987,227
TEST CELL RELEASE LOADING DEVICE
Frederick W. Stein, Atchison, Kans., assignor to Fred Stein Laboratories, Inc., Atchison, Kans., a corporation of Kansas
Filed Sept. 3, 1957, Ser. No. 681,742
5 Claims. (Cl. 222—502)

This invention relates to release loading devices for test cells designed to determine the moisture content of various grains, seeds and other materials, and refers more particularly to such release loading devices operable to provide uniform drops of materials to be tested into the test cell.

An object of the invention is to provide test cell release loading devices which are of relatively simple, rugged construction, provide high precision in operation, and are operable over long periods of continued use without malfunction, breakage or loss of precision.

Another object of the invention is to provide such test cell release loading devices wherein all parts of the releasing mechanism are completely enclosed during normal use and operation, yet readily swiftly accessible for repair or replacement.

Yet another object of the invention is to provide test cell release loading devices wherein all of the moving parts are of said construction and so designed as to encounter negligible wear over long periods despite high frequency of use.

Another object of the invention is to provide test cell release loading devices wherein the release mechanisms are operable to simultaneously drop a pair of hinged doors whereby to give a uniform repeatable drop of the material to be tested from the releasing device into a test cell positioned therebelow.

Another object of the invention is to provide test cell release loading devices wherein a pair of hinged doors are released simultaneously to drop material to be tested from the releasing device into a test cell and wherein the operator is unable to release one of the doors on actuation of the operating mechanism without releasing the other simultaneously therewith.

Still another object of the invention is to provide test cell release loading devices wherein the release mechanism automatically restores itself to a loaded or cocked position and, as well, returns the material supporting doors to a closed position upon release of the actuator of the release mechanism by the operator.

Another object of the invention is to provide test cell release loading devices wherein the material supporting doors thereof are always returned uniformly to the same level whereby charges of materials to be tested are always uniformly positioned thereabove.

Still another object of the invention is to provide test cell release loading devices wherein precision releases of materials to be tested from the devices are achieved without any precision operations, movements or actuation required by the operator other than the depression of a plunger operating the releasing mechanism, the rate or manner of depression of the plunger itself, for example, by the operator having no effect upon the proper release of the mechanism.

Another object of the invention is to provide test cell release loading devices having resilient means for cocking the releasing mechanism and returning material supporting doors in the device to the shut position wherein fatigue of said resilient means has no effect upon the proper setting of the release mechanism or its operation, so long as it will return the mechanism and doors to a certain position.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a side view of a first modification test cell release loading device, parts cut away to better illustrate the releasing mechanism per se, the release mechanism in cocked position.

FIG. 2 is a front view of the device of FIG. 1, the releasing mechanism in the position of FIG. 1, parts cut away to better illustrate the relationship of the parts.

FIG. 3 is a view along the lines 3—3 of FIG. 1 in the direction of the arrows.

FIG. 4 is a partial front view of the releasing mechanism of the first modification of the invention, similar to FIG. 2, but showing the releasing mechanism in fired position before return to the cocked position.

FIG. 5 is a view taken along the lines 5—5 of FIG. 4 in the direction of the arrows.

Figures 6, 7:
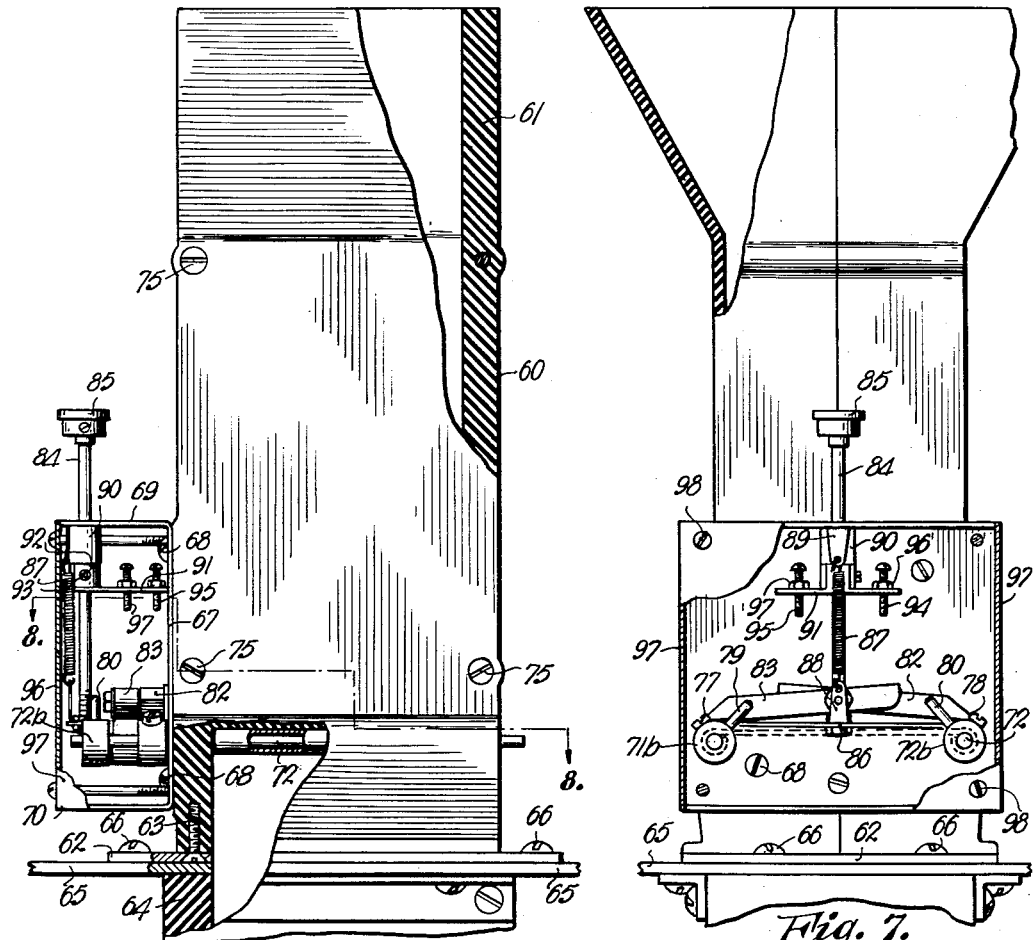
FIG. 6 is a side view of a second modification of the invention with parts cut away to better illustrate the releasing mechanism in the cocked position.
FIG. 7 is a front view of the test cell releasing device of FIG. 6, the release mechanism shown in the position of FIG. 6, with parts cut away to better illustrate the construction of the apparatus.

Referring to the first modification of the invention in FIGS. 1–5, at 10 is shown a cylindrical tube, housing or hopper having an open upper end 11 and an open lower end 12. The hopper preferably but not necessarily is of uniform inside diameter throughout its entire length. A mounting plate 13 is fixed on the side of the hopper 10 by side plates 14 and top and bottom plates 15. Mounting plate 13, side plates 14 and top and bottom plates 15 may be formed as an integral unit, if desired. Side plates 14 are welded, brazed or otherwise fixed to the outer surface of the hopper 10. Openings (not shown) are formed in the side plates 14 and the hopper 10 to permit the shaft 16 of conventional thermometer 17 to extend therethrough diametrically across the hopper whereby to take temperature readings on material positioned therein.

Referring now to FIG. 3, therein is shown the passage through the hopper 10 closed off by a pair of semicircular doors 18 and 19. Door 19 is mounted on a shaft 20 having a threaded opening 21 formed into the end thereof to receive enlarged headed screw 22 whose head rotatably fits within an opening 23 formed through the wall of the hopper 10. Door 18 is fixed to a hollow shaft 24 which extends into the hopper only to the juncture between the shafts 24 and 20 as shown at 25, while its other end extends rotatably through an opening (not shown) in the wall of the hopper and is fixed to a cylindrical block 26 whereby the door 18 and the block 26 rotate together. The remainder 20a of shaft 20 is of reduced outer diameter and extends rotatably through hollow shaft 24 and an opening in cylindrical metal block 26 and is fixed in and extends through secondary metal block 27. Door 19, shaft 20 and lesser diameter portion 20a of the shaft 20 rotate together independently of door 18, shaft 24 and block 26.

Fixed to blocks 26 and 27, the outward and inward portions thereof, respectively, are discs 28 and 29 (FIG. 4) having enlarged notches 30 and 31 formed in the peripheral edges thereof. The notches 30 and 31 are so formed that substantially radial faces 30a and 31a thereof are opposed, one to the other (as may be seen in FIG.

2) when doors 18 and 19 are in closed position at right angles to the axis of the hopper 10 (as shown in FIG. 3). Discs 28 and 29 are mounted asymmetrically on the blocks 26 and 27 adjacent the peripheral edges thereof. Arm 32, having short end 32a and downwardly extending flange 32b to engage the notches 31 and 30, is pivotally mounted around post 33. Post 33 has an enlarged head and is mounted on mounting plate 13 by secondary plate 34 which is fixed to mounting plate 13 by bolt 35.

Upper and lower plunger mounting flanges 36 and 37 are fixed to mounting plate 13 by rivets 36a and 37a, respectively. Plunger shaft 38, having upward motion limiting stop 39 with buffer 40 on its upper face and knob 41 at the upper end thereof, extends slidably through openings (not shown) in the mounting plates 36 and 37. Stop 39 is adjustably fixed to shaft 38 by set screw 39a. Cross bar 42 is fixed to shaft 38 between plates 36 and 37 and acts as a downward motion stop therefor. Resilient coil spring 43 is fixed at its lower end to bar 42 by engaging plate 43 and bolt 44 and at its upper end to plate 36 by engaging plate 45 fixed to the front end of mounting plate 36. Spring 43 tends to return plunger shaft 38 to its uppermost position with buffer 40 of stop 39 abutting the underface of plate 36.

Lever release arm 46 is fixed adjacent one outward end of bar 42 and has inwardly curved upper end 47 operable to engage outer end 32a of arm 32 whereby to lever upwardly the opposite end and release flange 32b from between the disc notches 30 and 31. The length of bar 46 is regulated so that such engagement does not take place until bar 42 approaches plate 37 for reasons to be described.

A pair of inwardly extending rods 48 and 49 are fixed to the bar 42. Plunger shaft 38 is positioned centrally relative the axes of door mounting shafts 20 and 24. Rods 48 and 49 are positioned equidistant from plunger shaft 38 and a distance apart less than the diameter of the discs 28 and 29. An outer housing 50 having four side walls 51, front face 52 and slot 53 in the upper slide wall to permit mounting around the shaft 38, may be fitted over the entire release mechanism to cover it for protection in use. Housing 50 is fitted on outwardly extending screws (not shown) and bolted thereto by nuts 53, the screws being fixed at their other ends to the mounting plate 13.

The operation of the first modification of the invention shown in FIGS. 1–5 will now be described. The description of the operation will start from the cocked position shown in FIGS. 1–3. As illustrated in these figures, the position of the various parts in the cocked position is as follows: doors 18 and 19 are positioned at right angles to the axis of the hopper 10 thus closing off the passage therethrough. Discs 28 and 29 are in their uppermost positions, rotated around the axes of the mounting blocks 26 and 27, whereby the notches 30 and 31 register with one another, the radial faces 30a and 31a thereof substantially vertical and separated laterally from one another sufficiently so that the flange 32b of the arm 32 may readily fit therebetween. Rods 48 and 49 bearing against the peripheral sides of discs 28 and 29, when bar 42 is in its uppermost position, maintain the discs in such a position that flange 32b can be inserted between radial faces 30a and 31a of notches 30 and 31. Shaft 38 is at its uppermost position with stop 39 abutting the underface of flange 36. Spring 43 maintains shaft 38 and bar 42 in their upper position. Arm 46 is disengaged from end 32a of bar 32.

Turning now to the drop or firing stage of the operation of the release mechanism, upon depression of shaft 38 by pushing downwardly on cap 41, shaft 38 slides downwardly through the openings in plates 36 and 37, removing rods 48 and 49 from the periphery of discs 28 and 29. The form of notches 30 and 31 is preferably such that, when rods 48 and 49 are holding the discs in their uppermost position, radial faces 30a and 31a of notches 30 and 31 do not actually engage the sides of flange 32b whereby to permit easy fitting of flange 32b into the notches. Upon removal of rods 48 and 49 from the periphery of the discs, then, radial faces 30a and 31a of the notches engage the outer surfaces of flange 32b because the weights of doors 18 and 19 always tend to rotate the shafts upon which they are mounted (which are connected to blocks 26 and 27, which in turn are fixed to discs 28 and 29). Doors 18 and 19 fall in an arc of only 90° until they are parallel with one another and the passage of the hopper 10 is open. Thus discs 28 and 29 themselves rotate only 90°, as is seen in FIG. 4, when they are freed. Rods 48 and 49, however, must be moved below the limit of fall of the discs before the latter are released by flange 32b or arms 48 and 49 will impede the fall of the discs and not permit the doors to fall completely open. The length of rod 46 must therefore be carefully regulated so that its inwardly extending end 47 does not contact the end portion 32a of arm 32 until such clearance is achieved.

The action of portion 47 of rod 46 then rotates the arm 32 in a clockwise direction around its pivot 33, thus raising flange 32b from notches 30 and 31. As the lower end of flange 32b clears the top edges of faces 30a and 31a, the rotational force exerted by doors 18 and 19 cause the discs to rotate with the doors, the shafts mounting the doors, and blocks 26 and 27, to the position shown in FIG. 4. In FIG. 4 it may be seen that arm 32 is raised, plunger shaft 38 is depressed with cap 41 close to plate 36, arm 46 is engaging portion 32a of arm 32 and spring 43 is stretched against its action tending to return shaft 38 upwardly. The discs have fallen apart their 90° travel matching the rotation of doors 19.

To return the release mechanism of the first modification from the fixed to the cocked position, the action will be taken up from the position of FIG. 4. Plunger shaft 38 is depressed with all the release mechanism parts in the position shown in FIG. 4 and immediately described. Upon relieving the pressure applied to cap 41, spring 43 draws shaft 38 and bar 42 upwardly. This action releases arm 32 from the pressure of inwardly extending portion 47 of rod 46 to permit it to fall downwardly. Rods 48 and 49 once again engage the peripheries of the discs 28 and 29 and exert an upward force thereon which rotates them around their axes (the centers of cylindrical blocks 26 and 27). As the discs rise, they meet flange 32b and arm 32 which have fallen downwardly around pivot 33 and drive them upwardly with flange 32b riding on the peripheries of the discs until notches 30 and 31 re-register and flange 32b can fall downwardly between the radial faces 30a and 31a, thus locking the discs, cylindrical blocks 26 and 27, their attached shafts and doors 18 and 19 in the position shown in FIG. 3.

Referring now to the second modification of the invention shown in FIGS. 6–9, the numbering of the parts in this modification will begin at 60, which number is employed to designate a hopper throat portion of substantially uniform diameter, rectangular in vertical cross section, and having a flared enlarged upper feed portion 61. Hopper throat 60 has lower plate 62 fixed thereto by screws 63, plate 62 fixable to a typical test cell 64, having an upper flange 65 to receive flange 62, by screws 66. Mounting plate 67 is fixed to the side wall of hopper throat 60 by screws 68 and has outwardly extending upper and lower flange portions 69 and 70.

Figure 8:
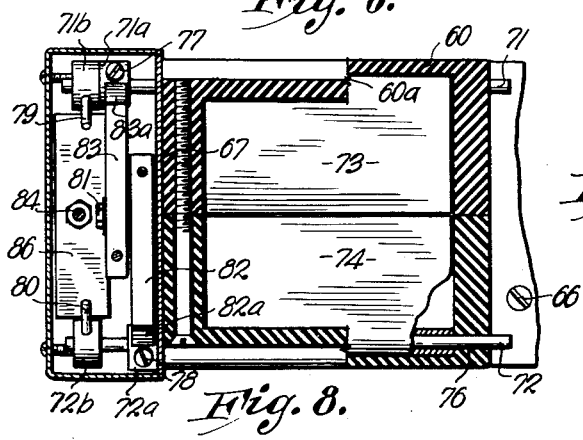
FIG. 8 is a view taken along the lines 8—8 of FIG. 6 in the direction of the arrows.
Figure 9:
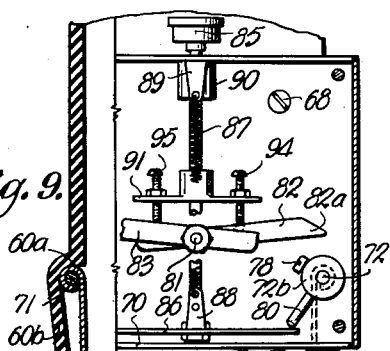
FIG. 9 is a fragmentary frontal view, partly in section, similar to that of FIG. 9 but showing the releasing mechanism in the fired position before return to the cocked position.

Referring primarily to FIG. 9, but also to FIG. 8, the throat portion 60 of the hopper is recessed outwardly in the lower portion thereof as at 60a, on each side of the hopper, whereby to receive rotatable shafts 71 and 72 out of the direct line of the passage and then faired back inwardly as at 60b. A pair of doors 73 and 74 are fixed to shafts 71 and 72 and rotate therewith. Doors 73 and 74 are so constructed as to fall vertically in line with the inside surface of the throat portion 60 of the hopper when open, as in FIG. 9 and are so formed as to close off the rectangular passage when they are in closed position as in FIG. 8. The hopper itself may be made in sections joined together by screws 75.

Shafts 71 and 72 are rotatably socketed in openings 76 extending through the walls of the hopper 60, and each shaft has a pair of cylindrical blocks 71a, 71b, 72a and 72b fixedly mounted on one end thereof by set screws to rotate therewith. Blocks 71a and 72a, nearest the hopper, have headed set screws 77 and 78 threaded therein, while blocks 71b and 72b have posts 79 and 80 fixed thereinto. A shaft 81 having an enlarged head is fixed to mounting plate 67 and hopper throat portion 60 and extends outwardly therefrom. A pair of arms 82 and 83 are rotatably mounted on shaft 81 and have each a beveled end 82a and 83a. Blocks 71a and 72a are positioned on shafts 71 and 72 so that the beveled ends of arms 82 and 83 are opposite the set screw heads 78 and 77, respectively.

Plunger shaft 84 having cap 85 fixed to the top end thereof extends slidably through an opening in the upper mounting plate 69. Shaft 84 has flange plate 86 fixed to the lower end thereof. Plate 86 is symmetrically mounted on the shaft 84 and has a width slightly less than the distance between cylindrical blocks 71b and 72b. Resilient spring 87 connects to flange 88 fixed to plate 86 and, at its other end, to flange 89 fixed to upper mounting plate 69. Bushing 90 provides for smooth upward and downward movement of shaft 84 relative plate 69. Bushing 90 is fixed to plate 69 and does not move with shaft 84, shaft 84 passing through a passage (not shown) extending therethrough. Thus, spring 87 tends to maintain the shaft 84 always in its uppermost position, shown in FIGS. 6 and 7. Actuating plate 91 is attached to bushing 92, the latter fixed on shaft 84 by set screw 93, and has adjustable screws 94 and 95 threaded therethrough and so positioned thereon as to contact the ends of arms 82 and 83 opposite the beveled portions 82a and 83a. Depression of plunger shaft 84 causes the ends of screws 94 and 95 to rotate arms 82 and 83 around their pivotal mounting 81. Nuts 96 and 97 operate to fix the relative positions of screws 94 and 95 relative plate 91. Plate 91 is spaced upwardly from plate 86 a distance to be described.

The operation of the second modification of the releasing device shown in FIGS. 6–9 will now be described, starting from the "cocked" position of FIGS. 6–8. In this position, doors 73 and 74 close off the passage of the hopper throat 60 and are at right angles to the axis thereof. Doors 73 and 74, to open to the position of FIG. 9, only rotate 90° from the position of FIG. 8. Thus shafts 71 and 72 also rotate only 90°. As the walls 60b of housing 60 are tapered below the recess 60a, the lower ends of the doors, when open, will rest thereagainst, the doors themselves hanging vertically. Spring 87 maintains shaft 84 in its uppermost position with bushing 92 abutting the underside of bushing 90 to limit the upward motion. Screws 94 and 95 are free of the ends of arms 82 and 83. Beveled ends 82a and 83a of arms 82 and 83 abut the side faces of the heads of set screws 77 and 78 whereby to lock shafts 71 and 72 against rotation, even if plunger 84 should be partly depressed. Plate 86 abuts the underside of pins 79 and 80.

To release doors 73 and 74 to permit them to fall downwardly of their own weight, thus rotating shafts 71 and 72, plunger shaft 84 is depressed by exerting force upon cap 85. Plate 86 can be depressed downwardly without releasing shafts 71 and 72 for rotation, at least until the bottom portions of the screws 94 and 95 abut the ends of the arms 82 and 83. Since doors 73 and 74 are to rotate 90°, it is desirable that the distance between plate 86 and the bottom ends of the screws 94 be sufficient that the plate 86 itself will be below the limit of fall of the pins 79 and 80 in their 90° rotation when the screws abut the arms. When such is the case, once shafts 71 and 72 are released, their rotation will not be stopped until the full 90° swing of the doors has taken place. As shaft 84 is further depressed, the ends of the screws 94 and 95 abut the ends of the arms 82 and 83 thus pivoting them about shaft 81. The beveled ends 82a and 83a of the arms 82 and 83 are raised and clear the heads of set screws 77 and 78. The weights of the doors then rotate shafts 71 and 72 as the doors fall to the position shown in FIG. 8. Any material to be tested above the doors is permitted to fall by this motion. Pins 79 and 80 and set screws 77 and 78 rotate to the position shown in FIG. 9 with the pins 79 and 80 either resting upon or immediately above the plate 86 at the latter's lowermost depressed position.

To return the mechanism to the cocked position from the fired position of Fig. 9, pressure is merely released slightly on the cap 85 to permit spring 87 to return shaft 84 upwardly. As the shaft moves upwardly, so does plate 86 therewith, thus carrying pins 79 and 80 therewith and rotating the shafts 71 and 72 attached to the cylindrical blocks 71b and 72b. As blocks 72a and 71a rotate, set screw heads 77 and 78 pass under arms 82 and 83 and, as plate 86 reaches its uppermost postion of FIG. 7, beveled ends 82a and 83a fall past the side faces of the set screws to again lock them in the cocked position.

Front and side coverage of the operating mechanism is provided by outer face 96 having side faces 97 which may be abutted against upper and lower flanges 69 and 70 and screwed into place by screws 98. This arrangement provides easy access to the release mechanism for repair or replacement of the parts, if necessary.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention I claim:

1. A test cell releasing device comprising a vertical hopper, a first horizontal shaft extending across the hopper and rotatably mounted in the wall thereof, a first door mounted on said first shaft and formed to substantially completely block the hopper on one side of said first shaft when said door is in horizontal position, a second horizontal shaft rotatably mounted on said first shaft, a second door mounted on said second shaft and formed to substantially completely block the hopper on the other side of the said first shaft when said second door is in horizontal position, said first and second shafts extending out of one side of the hopper, a first and a second disc fixed to said first and second shafts and rotatable therewith, respectively, a notch so formed in the periphery of each of said discs so as to permit registry of said notches when the doors are in horizontal position, means for engaging said notches when they are in registry, means for disengaging said notch engaging means from said notches to permit said doors to fall from horizontal position simultaneously, thereby rotating said discs out of notch registering position, and means for returning said discs to the notch registering position.

2. A releasing device as in claim 1 wherein the means for engaging the notches when they are in registry comprises an arm pivotally mounted on the hopper having a projecting portion to enter said notches.

3. A releasing device as in claim 2 wherein the means for disengaging said notch engaging means from the notches to permit the door to fall from horizontal position comprises a second arm operable to pivot said notch engaging arm so as to remove said projection from said notches.

4. A releasing device as in claim 1 wherein said discs are mounted noncentrally on said shafts and the means to return said discs to the notch registering position comprise a pair of arms vertically movable relative to the hopper.

5. A test cell releasing device comprising a vertical hopper, a first horizontal shaft extending across the hopper and rotatably mounted in the wall thereof, a first door mounted on said first shaft and formed to substantially completely block the hopper on one side of the first shaft when said door is in horizontal position, a second horizontal shaft rotatably mounted on said first shaft, a second door mounted on said second shaft and formd to substantially completely block the hopper on the other side of the first shaft when said second door is in horizontal position, said first and second shafts extending out of one side of the hopper, a first and a second member fixed to said first and second shafts, respectively, and rotatable therewith, engageable means on each of said members so positioned as to permit registry of same when said doors are in horizontal position, catch means to engage said engagement means on said members when said doors are in said horizontal position and engagement means in registry, means to disengage said catch means to permit said doors to fall from said horizontal position simultaneously, thereby rotating said members out of engagement means registering position and means to return said doors to the horizontal position to permit reengagement of said engagement means on said members by said catch means.

References Cited in the file of this patent

UNITED STATES PATENTS

| | | |
|---|---|---|
| 909,188 | James | Jan. 12, 1909 |
| 2,672,237 | Noble | Mar. 16, 1954 |
| 2,713,955 | Harbers | July 26, 1955 |

FOREIGN PATENTS

| | | |
|---|---|---|
| 912,406 | Germany | May 28, 1954 |